United States Patent
Burke et al.

(10) Patent No.: US 6,427,491 B1
(45) Date of Patent: Aug. 6, 2002

(54) METHOD FOR MAKING FIBERS HAVING CORES WITH NON-CIRCULAR CROSS-SECTIONS

(75) Inventors: Gerald E. Burke, Painted Post; Carlton M. Truesdale, Corning; Luis A. Zenteno, Painted Post, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/377,926

(22) Filed: Aug. 20, 1999

(51) Int. Cl.⁷ ............................................. C03B 32/027
(52) U.S. Cl. ............................. 65/403; 65/404; 65/409; 65/411; 65/433
(58) Field of Search .................. 65/433, 409, 393, 65/404, 403, 411

(56) References Cited

U.S. PATENT DOCUMENTS

| | | | |
|---|---|---|---|
| 2,484,003 A | * 10/1949 | Simison | |
| 3,272,063 A | * 9/1966 | Singer, Jr. | |
| 3,455,667 A | * 7/1969 | Snitzer et al. | |
| 3,814,499 A | * 6/1974 | Marcatili | 385/123 |
| 3,844,752 A | * 10/1974 | Kaiser | 65/393 |
| 3,902,089 A | * 8/1975 | Beasley et al. | 313/105 C |
| 4,630,889 A | * 12/1986 | Hicks, Jr. | 385/123 |
| 4,978,377 A | * 12/1990 | Brehm et al. | 65/403 |
| 4,983,195 A | * 1/1991 | Nolan | |
| 5,176,728 A | * 1/1993 | Fugate | |
| 5,309,540 A | * 5/1994 | Turpin et al. | 385/123 |
| 5,353,365 A | * 10/1994 | Dumas et al. | 385/102 |
| 5,422,897 A | 6/1995 | Wyatt et al. | 372/6 |
| 5,629,997 A | 5/1997 | Hardy, Jr. | |
| 5,689,578 A | 11/1997 | Yamauchi et al. | 385/123 |
| 5,774,484 A | 6/1998 | Wyatt et al. | 372/6 |
| 5,802,231 A | 9/1998 | Nagano et al. | |
| 5,891,210 A | * 4/1999 | Watanabe et al. | 65/406 |

FOREIGN PATENT DOCUMENTS

| | | | | |
|---|---|---|---|---|
| EP | 1440178 | * | 6/1976 | 65/404 |
| JP | 60-246236 | * | 12/1985 | 65/409 |
| JP | 62-235908 | | 10/1987 | |
| JP | 63-291831 | | 11/1988 | |
| JP | 01-148724 | | 6/1989 | |
| JP | 06-003537 | | 1/1994 | |
| WO | WO 98/58884 | | 12/1998 | |

* cited by examiner

*Primary Examiner*—John Hoffmann
(74) *Attorney, Agent, or Firm*—Volentine Francos, PLLC

(57) ABSTRACT

An optical fiber with a non-circular cross-section is realized by creating a void having the desired cross-section in a housing and filling the void with an optical material. This structure is then collapsed to solidify it and drawn to desired dimensions. The optical material may be rods, soot or ground material.

10 Claims, 2 Drawing Sheets

METHOD FOR MAKING FIBERS HAVING CORES WITH NON-CIRCULAR CROSS-SECTIONS

CROSS REFERENCE TO RELATED APPLICATIONS

The present application is related to one commonly assigned, co-pending application having a docket numbers D 4384, filed concurrently herewith.

BACKGROUND OF THE INVENTION

The present invention is directed to forming fibers having cores with non-circular cross-sections, single-mode or multi-mode, with step-index or graded-index profiles, and the fibers, fiber lasers and amplifiers formed thereby. These fibers are advantageously used in brightness converter fiber laser devices to pump single mode fibers amplifiers, such as Er-doped fiber amplifiers, using broad area multi-mode laser diode pumps.

Originally, single mode fiber lasers and amplifiers were pumped using single mode semiconductor laser diodes. However, these semiconductor pump lasers do not output very much power, limiting the brightness output by the fiber laser or amplifier. In order to increase the power output by the pump lasers, the laser diodes were designed to be broad area lasers, which output a multi-mode beam having a beam cross-section with a large aspect ratio. Additionally, the beam along one axis will be much more divergent along one axis, i.e., the "fast axis" than along an orthogonal axis, i.e., the "slow axis". For example, in the plane of a laser diode junction, the slow axis beam divergence has a numerical aperture in the range of 0.07 to 0.15, while in the orthogonal plane, the fast axis has a higher numerical aperture in the range of 0.55 to 0.7.

The output power of such broad-area lasers is in the range of 1 to 10 W. compared to only 0.2 to 1 W from single-mode semiconductor lasers. Special fibers, such as those in accordance with the present invention, are required to collect and transform the pump power from such high power multi-mode beams into single mode beams that can be coupled into and absorbed by single mode fibers, e.g., Er fibers, that deliver amplified output power in excess of 1 W.

While providing a fiber with a core having a diameter equal to the width of the multi-mode pump beam will capture the entire beam, such coupling does not optimize brightness, which is the power per unit area per unit solid angle. Thus, the output brightness of the fiber is not significantly improved. Further, the use of such a large core does not address the problem of converting multi-mode pump light into as a single mode output.

Since the beam output by the broad area laser is a multi-mode beam, the difference in cross-section between the beam and the core can be compensated for by shaping the beam to match the shape of the core. However, any such shaped beam will still be a multi-mode beam, and attempts to couple such a shaped beam into a single-mode fiber, such as an erbium doped fiber amplifier, will lead to poor coupling efficiency. In general, if the multi-mode beam consists of ten modes, the coupling of power into a single mode core will be less than $\frac{1}{10}$.

Attempts at using multi-mode laser diode beams to pump a single mode core Er amplifier involve creating a brightness converter using a solid-state laser (disclosed in commonly assigned D 14163 filed concurrently herewith), a tapered fiber laser (disclosed in commonly assigned D 14384 filed concurrently herewith) or a double-clad fiber laser. A double-clad structure includes two claddings, a first clad adjacent to a circular, single mode core, and a second clad, surrounding the first clad. The cross-section of the first clad may be designed to be a desired shape, e.g., matched to the near field emitted by the pump source or any other scheme or shape which increases absorption efficiency of the pump beam. The numerical aperture between the first and second clad layers must be large enough to capture the output of the pump laser. The actual increase in brightness realized depends on the ratio of pump cladding area to core area, with the higher the ratio, the greater the brightness. However, this disparity in area between the core and cladding cross-sections necessitates a long device length, since the absorption of the pump radiation is also proportional to this ratio.

Thus, these double-clad arrangements facilitate pumping of the fiber using a multi-mode first cladding for accepting and transferring pump energy to a core along the length of the device. Typically, a high numerical aperture, related to the difference in refractive index between the first and second cladding, is desired. Typically, the first clad layer is made of glass and the second clad layer is made of plastic, e.g., fluorinated polymer, having a relatively low refractive index, i.e., lower than that of glass, in order to increase the numerical aperture. Such plastic may not have the desired thermal stability for many applications, may delaminate from the first cladding, and may be susceptible to moisture damage. Further, the step-index double clad concept is not efficient with three-level transitions, such as the 980 nm transition of ytterbium.

SUMMARY OF THE INVENTION

The present invention is therefore directed to a method of creating fibers having cores with non-circular cross-sections, and the fibers, fiber lasers and amplifiers formed thereby, which substantially overcomes one or more of the problems due to the limitations and disadvantages of the related art.

Further, the present invention allows all-silica double clad fibers to be made. Additionally, the present invention enables the fabrication of new brightness converting fiber structures and geometries.

At least one of the above and other advantages may be realized by forming an optical fiber including forming a void having a non-circular cross-section in a housing, filling the void with an optical material, and collapsing and drawing the housing after said filling to form a fiber of a desired dimension.

At least one of the above and other advantages may be realized by providing an optical fiber including a housing having a void with a substantially non-circular cross-section, and a core substantially filling the void.

At least one of the above and other advantages may be realized by an optical fiber comprising a cladding and a core with an active region, the active region having a same refractive index as material immediately adjacent the active region.

At least one of the above and other advantages may be realized by providing a laser system including a multi-mode light source outputting multi-mode light, a brightness conversion fiber receiving multi-mode light from the multi-mode light source and outputting single mode light, the brightness conversion fiber comprising a cladding and a core with an active region, the active region having a same refractive index as material immediately adjacent the active region, and a single mode laser fiber receiving single mode light output from the brightness conversion fiber and outputting a laser beam.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, aspects and advantages will be described with reference to the drawings, in which.

DETAILED DESCRIPTION OF THE PREFERRED EMBODIMENTS

Figure 1:
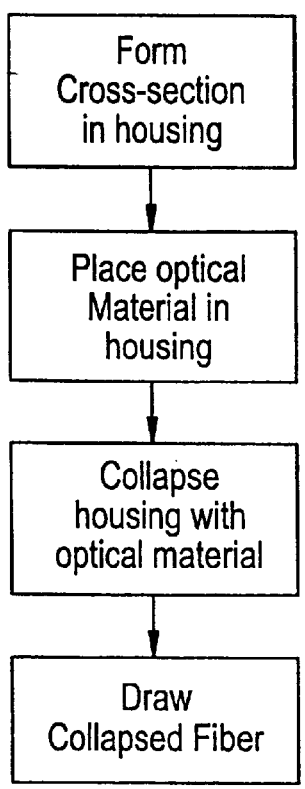
FIG. 1 illustrates a flow chart of the method for forming fibers in accordance with the present invention.

The present invention will be described in detail through preferred embodiments with reference to accompanying drawings. However, the present invention is not limited to the following embodiments but may be implemented in various types. The preferred embodiments are only provided to make the disclosure of the invention complete and make one having an ordinary skill in the art know the scope of the invention. The thicknesses of various regions are emphasized for clarity in the accompanying drawings. Throughout the drawings, the same reference numerals denote the same elements.

The general method of the present invention is shown in FIG. 1. First, a cross-section is formed in a housing which is to serve as a cladding region. This cross-section is typically determined in accordance with the shape, particularly the numerical aperture, of the light beam to be input to the fiber. However, other factors, for example, coupling of light into the center of the fiber, may be considered.

Once the cross-section, which forms a void in the housing, has been created, an optical material to serve as the core is placed in this void. The optical material is preferably a plurality of optical rods. When optical rods are used, while the aspect ratio is still determined in accordance with the input light beam, the actual thickness is also dictated by available rod sizes which are easily obtained, and then the length may be determined based on this thickness to achieve the desired aspect ratio. Alternatively, optical material in the form of soot or ground optical material may be used to fill the void.

Once the optical material has been placed in the void, the entire structure is collapsed to solidify the structure and to have the optical material substantially fill the void. This collapsing is performed at a sufficiently high temperature to insure sufficient melting to form a solid structure. Preferably before the collapsing, the structure is cleaned with a solution and then dried to remove any excess solution. The solid structure is then drawn to the desired dimensions. While the aspect ratio remains the same, the total dimensions are reduced by the drawing.

Figure 2A:
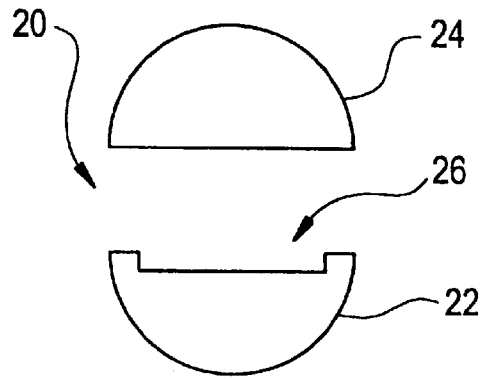
FIG. 2A illustrates a housing into which a plurality of fibers is to be inserted in accordance with the present invention.

An example of a specific manner of forming a housing having a void is shown in FIG. 2A. A housing 20, e.g., a quartz tube, may be cut to a desired length and then cut lengthwise in half to form a base section 22 and a top section 24. The housing 20 has a circular cross-section. The base section 22 may then be machined to form a groove 26, which serves as the void, in accordance with a desired aspect ratio. In the present example, in which rods 30 are to be inserted in the groove 26, the depth of the groove 26 is also determined in accordance with a diameter of the rods to be inserted therein.

While only the base section is altered in this example, both sections may be altered to provide the desired cross-section. Further, while the two sections are cut roughly in half in this example, accounting for the thickness of the groove, the lengthwise cutting of the housing may be in any desired proportion necessary to realize the desired cross-section. Finally, if using certain techniques or certain housings to form the cross-section, such lengthwise cutting may not be needed at all.

Figure 2B:
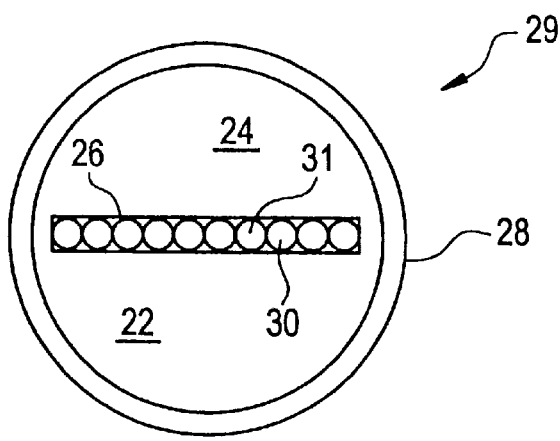
FIG. 2B illustrates the housing of FIG. 2A enclosing a plurality of fibers in accordance with the present invention.

The base section 22 and the top section 24 are then joined to hold the rods 30 in place. As shown in FIG. 2B, this may be achieved by placing the base section 22, the rods 30 and the top section 24 in a surrounding housing 28. Such joining may be realized using any appropriate bonding technique, and joining may not always be necessary.

Figure 3:
FIG. 3 illustrates an example cross-section of a fiber of the present invention.

A resulting structure 29 is then collapsed to form a solid structure, which is then drawn to the desired dimensions. An outline of an example of a cross section formed after the collapsing and drawing of the structure 29 is shown in FIG. 3. As can be seen therein, a core cross-section 32 has the same aspect ratio as the rods 30 arranged in the groove 26, but the distinctions between individual rods are blurred.

The core cross-section 32 was actually achieved in the following manner. The rod(s) were formed using an optical waveguide flame hydrolysis process. Each rod had a composition of $GeO_2$, $TiO_2$, and $SiO_2$ which is nearly uniform across the rod. These rods were then drawn into a 2 mm diameter rod. The rod(s) may then be cut to a desired length. A quartz housing having the desired length was cut lengthwise, with one piece having a height a little more than 2 mm, i.e., the diameter of the rods, larger than the other piece. A 21 mm by 2 mm groove was machined into the larger piece. Ten of the rods of the desired length were then inserted in the groove. The smaller piece was then placed on top of the rods. Then this entire structure was inserted into a tube having an inner diameter of 26 mm and an outer diameter of 27 mm. The tube structure was cleaned using chlorine and dried at 1500EC to remove any excess chlorine. The cleaned tube structure was collapsed at 2000EC and then drawn to form a 125 micron fiber. The drawn structure has a core as outlined in FIG. 3.

Figure 4A:
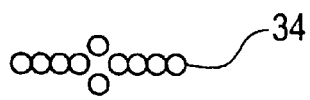
FIGS. 4A–4B illustrate further examples of cross-section of fibers of the present invention before being collapsed.
Figure 4B:
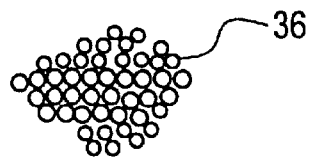

FIGS. 4A and 4B illustrate additional sample core cross-sections, prior to collapsing and drawing, which may be formed in accordance with the present invention. In FIG. 4A, additional rods are placed adjacent to the central rod to form a cross core cross-section 34. The additional rods in the cross core cross-section 34 increase the coupling efficiency of light into the center of the fiber. In FIG. 4B, the rods are arranged to form an elliptical core cross-section 36, which may more closely match some beam profiles.

Any desired cross-section may be formed, including rectangular and square cross-sections. For the particular application of brightness converting in which broad band, multi-mode sources are used, the aspect ratio is preferably equal to or greater than 3:1. The design flexibility of the method of the present invention is advantageous for forming cores having substantially non-circular cross-sections, whether these cross-section have a symmetric form, even a 1:1 aspect ratio, such as a square, or have aspect ratios greater than 1:1.

Figure 5:
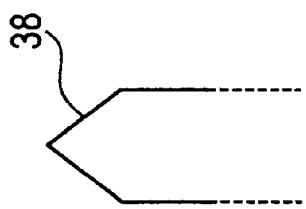
FIG. 5 illustrates an alternative cross-section of an optical rod to be used in creating the fiber of the present invention.

In any of the configurations, the rods do not have to be made of the same material, but may be different to enhance coupling and/or propagation efficiency. Additionally, the final fiber may be altered to have a cross-section as shown in FIG. 5, in which an end face 38 thereof is beveled or wedged. Such beveling results in the end face acting as a lens. The beveled end face 38 decreases the divergence angle of the launched beam. Any other desired features may be formed on the end face of the fiber.

While the design flexibility afforded by the method of the present invention is clearly useful for many applications, including either a passive or an active core, a specific application of particular importance is discussed below.

As noted in the Background, much of the motivation for the design flexibility of the method of the present invention arose from the need to couple enough multi-mode pump light into a single transverse mode fiber laser or amplifier which in turn is used to pump a single mode fiber, e.g., a rare-earth doped fiber such as an erbium doped fiber amplifier. In accordance with the present invention, the fiber laser may be achieved by doping the rods with an index raising dopant, e.g., Ge. Thus, the light transmitted through the fiber is confined within the core due to the difference in the index of refraction between the core and the adjacent cladding material.

The rods which are used to create the active region, typically in the center of the core structure, are further doped with an active dopant, typically a rare earth dopant, e.g. Yb. It is noted that this active dopant does not need to raise the index of the rods forming the active region. In accordance with the present invention, light is further confined within the fiber laser core around the active region by gain guiding. The light is confined therein without requiring a difference in refractive index between the active region and adjacent regions. Further, such structure allows only the fundamental laser mode to be preferentially excited. By appropriately confining the active region to the center of the core, the fundamental mode has enough gain to oscillate. The rest of the modes have a lower gain and do not oscillate. Thus a fiber laser, even with a multi-mode core, emits a single-mode beam. This effect may be enhanced if single-mode feedback is included in the laser cavity.

Figure 6:
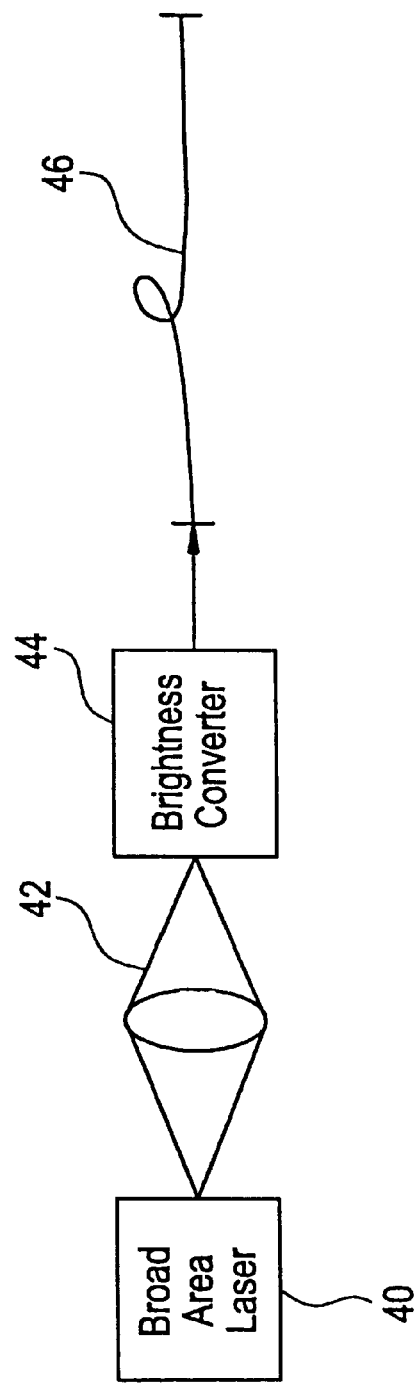
FIG. 6 is a schematic illustration of a system using the fiber of the present invention to efficiently provide multi-mode pump light to a single mode fiber.

The fiber having this active region may be used as a laser or amplifier itself or may be used to pump other single mode fiber lasers. Thus, the fiber may be used as a converter for converting multi-mode pump light into amplified single-mode pump light. An example of such a system is shown in FIG. 6. A broad area laser 40 is supplied via an optical system 42 to a fiber in accordance with the present invention serving as a brightness converter 44. Multi-mode light from the broad area laser 40 is converted into single mode light by the brightness converter 44. The single mode light may be used to pump a single mode amplifier 46, e.g., an Er doped amplifier.

The active region of the fiber of the present invention may be doped, e.g. with germanium or aluminum, to further increase the index of refraction, so that the confinement of the light within the single mode active region is due to both the gain guiding and the refractive index difference. The cross-section 4A, with the rods above and below the active region having the same refractive index of the rods on either side of the active region, may also be used to provide symmetry to the propagation mode in the active region.

The rods may also be used to provide a gradient index core of any desired profile. For example, rods on the outer edges of the core region have a higher refractive index than that of the clad region, while the next set of rods closer to the active region have a still higher refractive index, etc., until the rods adjacent the active region have the highest refractive index of the rods in the core outside the active region. The core region may have the same index or higher as this highest refractive index. Further, the use of doped rods which are then collapsed allow higher refractive indices to be realized, which results in higher numerical apertures. Thus, the structure in accordance with the present invention allows high numerical apertures to be achieved using an all glass structure, i.e., the use of a low refractive index polymer to lower the refractive index of the clad is not needed.

While the creation of an active central core region to which multi-mode pump light is coupled is a particularly advantageous use of the design flexibility offered by the method of the present invention, other designs may also be created. For example, an active region may be sufficiently large to support oscillation of multiple modes, e.g. composed of several rods. However, an active region of this size will support only the fundamental mode if the active region is confined near the axis. This may be achieved using a number of single-mode feedback mechanisms. For example, such single-mode feedback may be realized by tapering this structure, as disclosed in the related, commonly assigned co-pending application entitled "Tapered Fiber Laser", U.S. patent application Ser. No. 09/378,770, filed concurrently herewith now U.S. Pat. No. 6,324,326. Further, the method of the present invention may be used to create a fiber of any desired cross-section which is completely passive, i.e., has no active region.

Further, the use of rods which are then collapsed to form the core region allows a lot of an index raising dopant, such as Ge+ to be incorporated into the core region. The high level of index raising dopant allows glass, e.g. silica, to be used as the core material, since a sufficient index difference between the core and the clad may be realized. Further, by confining the oscillation to the active region using gain guiding, rather than by increasing the refractive index of the active region, the active region is formed by doping with a gain dopant in addition to the index raising dopant of the core region. Thus, the entire structure may be formed of glass.

While the present invention is described herein with reference to illustrative embodiments for particular applications, it should be understood that the present invention is not limited thereto. For example, any mechanism for increasing coupling of light, such as the double clad structure, may be employed in connection with the present invention. Those having ordinary skill in the art and access to the teachings provided herein will recognize additional modifications, applications, and embodiments within the scope thereof and additional fields in which the invention would be of significant utility without undue experimentation. Thus, the scope of the invention should be determined by the appended claims and their legal equivalents, rather than by the examples given.

What is claimed is:

1. A method of forming an optical fiber, comprising:

forming a void having a non-circular cross-section in a housing, wherein said forming further comprises dividing said housing into two portions and machining a region to serve as the void in at least one of said two portions;

filling the void with a plurality of optical rods; and collapsing and drawing the housing after said filling to form a fiber of a desired dimension.

2. The method as recited in claim 1, further comprising, after said filling, rejoining said two portions of the housing to enclose said plurality of optical rods.

3. The method as recited in claim 2, wherein said rejoining comprises placing said two portions with said plurality of optical rods in an external housing.

4. The method as recited in claim 1, further comprising, before said collapsing, cleaning said housing filled with said plurality of optical rods.

5. A method of forming an optical fiber, comprising:

providing a housing having a circular cross-section;

forming a void having a non-circular cross-section in said housing, wherein said forming further comprises dividing said housing into two portions and machining a region to serve as said void in at least one of said two portions;

filling the void with an optical material; and collapsing and drawing said housing after said filling to form a fiber of a described dimension.

6. The method of claim 5, further comprising, after the filling, rejoining the two portions of the housing to enclose the optical material therein.

7. The method of claim 6, wherein said rejoining comprises placing the two portions with the optical material in an external housing.

8. The method of claim 5, further comprising, before said collapsing, cleaning the housing filled with the optical material.

9. The method of claim 5, wherein said optical material further comprises a plurality of optical rods.

10. The method of claim 5, wherein said optical material is a ground optical material.

* * * * *